United States Patent [19]

Chollet

[11] 4,066,463

[45] Jan. 3, 1978

[54] SILICATE-CONTAINING FLAME-RESISTANT ADHESIVE COMPOSITION

[76] Inventor: Jacques Antoine Leon François Chollet, 16, Avenue Victor Hugo, 92 170 Vanves, France

[21] Appl. No.: 613,857

[22] Filed: Sept. 16, 1975

[30] Foreign Application Priority Data

Oct. 9, 1974 France .................... 74.33915

[51] Int. Cl.$^2$ ........................... C09D 5/18
[52] U.S. Cl. .................. 106/15 FP; 106/74; 106/80; 106/81; 106/84; 106/193 J; 106/197 C; 106/213; 106/214; 252/8.1; 252/62
[58] Field of Search ............. 106/15 FP, 71, 74, 80, 106/81, 84, 193 J, 287 S, 197 C, 213, 214; 252/62, 8.1

[56] References Cited

U.S. PATENT DOCUMENTS

| 2,323,029 | 6/1943 | Goodrich | 106/84 |
|---|---|---|---|
| 2,536,871 | 1/1951 | Carlton | 106/84 |
| 2,736,678 | 2/1956 | Olix | 106/80 |
| 3,009,829 | 11/1961 | Gouveia | 106/74 |
| 3,150,989 | 9/1964 | Parson | 106/80 |

FOREIGN PATENT DOCUMENTS

798,212  11/1968  Canada .......................... 106/74

*Primary Examiner*—Lorenzo B. Hayes
*Attorney, Agent, or Firm*—Young & Thompson

[57] ABSTRACT

This invention relates to a silicate-containing flame-resistant adhesive composition comprising an inorganic component consisting, with respect to the weight of the total composition, of (a) 20-90wt% of a concentrated aqueous alkali metal silicate solution, (b) 5-25wt% of a clay and 2-7wt% of deflocculated asbestos fibres; and (2) an organic component present as a 30-70% aqueous solution of a carboxymethylcellulose, a starch ether, a dextrin or mixtures thereof, this organic component being present in an amount (dry weight) of 0.2-2wt% by weight of the total composition. The composition may be prepared by (A) charging the silicate solution in a container and rotating same in a given direction, (B) intimately dispersing the aqueous organic component solution while rotating same in the opposite direction, (C) adding the clay on completion of the dispersion, with continued stirring and (D) then dispersing the deflocculated asbestos fibres in the stirred mixture.

7 Claims, No Drawings

SILICATE-CONTAINING FLAME-RESISTANT ADHESIVE COMPOSITION

This invention relates to a flame-resistant adhesive composition having a long pot life, useful for adhering together a variety of articles and objects and also for coating substrates made of various materials.

The composition of this invention is characterized in that it comprises (1) an organic component which, with respect to the total weight of the composition, consists of (a) from 20% to 90% by weight of a concentrated aqueous solution of alkali metal silicate, (b) from 5% to 25% by weight of a clay and (c) from 2% to 7% by weight of deflocculated asbestos fibres; and (2) an organic component, present as a 30–70% aqueous solution, selected from a carboxymethylcellulose, a starch ether, a dextrin and a mixture thereof, said component being present in an amount comprising about 0.2% to about 2% (dry weight) by weight of the total composition.

According to an embodiment of this invention, the composition is applicable to the bonding of articles and the inorganic component comprises 50–90% of said silicate solution, 5–25% of said clay and 2–6% of said asbestos.

According to another embodiment, the composition is applicable to the production of coatings and the inorganic component comprises 20–50% of said silicate solution, 7–20% of said clay and 2–7% of said asbestos, the solution containing additionally 30–60% inorganic filler by weight of the total composition.

According to still another embodiment, the composition is applicable to the production of coatings which swell under the effect of heat and comprises, additionally, 1–20% swelling agent by weight of the total composition.

This invention relates also to a process for the preparation of the above-described composition, comprising (a) charging said silicate solution in a container and rotating it in a given direction; (b) intimately dispersing the aqueous organic component solution in the stirred silicate while rotating said organic component solution in the direction opposite to that in which the silicate was rotated; (c) on completion of the dispersion, adding the clay with continued stirring and (d) thereafter dispersing the deflocculated asbestos in the stirred mixture.

According to another feature of this invention, the inorganic filler, when used, is added after step (b) and prior to addition of the clay.

Other features and advantages of this invention will be apparent from the following detailed description.

The flame-resistant adhesive composition of this invention comprises essentially (1) an inorganic component and (2) an organic component.

The inorganic component comprises a combination of three constituents, viz.; (a) 20–90wt%, by weight of the total composition, of a concentrated aqueous solution of an alkali metal silicate; it is preferred to use a 38°–40° Be sodium silicate solution or a 42° Be potassium silicate solution; (b) 5–25wt%, be weight of the total composition, of a clay, preferably powdered kaolin; and (c) 2–7wt%, by weight of the total composition, of deflocculated short asbestos fibres, i.e., subjected prior to use to a mechanical defloculating treatment to loosen and separate the fibres from one another.

The organic component consists of a 30–70% (preferably about 50%) aqueous solution of a carboxymethylcellulose, of a starch ether or of a dextrin or a mixture thereof. The organic component comprises 0.2–2wt% (dry weight) by weight of the total composition.

One of the applications of the composition of this invention is the bonding of various articles, for example the bonding of (a) pieces or sheets made of aluminum, of black sheet iron, of galvanized sheet metal or of zinc-plated sheet metal, of glass, of cement, etc., on (b) wood, plywood, particle or fibre boards, polystyrene foam, phenol resins, polyurethanes, and the like. The following bondings may also be achieved: wood-wood, wood-polystyrene, carpet-floor, cement-wood, and the like.

A highly adhesive bonding is obtained thereby. The composition is flame-resistant and flameproof; it withstands elevated temperatures and does not release any toxic gas. Therefore, the adhesive layer obtained after setting constitutes a barrier against fire due to its fire-retarding action, preventing flame propagation and the evolution of smoke, etc..

Officially controlled standard tests have shown the composition to be classified as "flame-resistant" according to the usual standard specifications.

For the latter application, the inorganic component comprises advantageously 50–90% of said silicate solution, 5–25% of said clay and 2–6% of said asbestos. It is preferred to add to the composition 1–3wt%, by weight of the total composition, of a liquid silicone to impart water-repellent properties to the adhesive composition. Setting accelerators (in an amount of 1–3wt%, for example) such as zinc chloride, cadmium chloride, fluosilicates, etc.. may also be added to the composition.

Whenever desired, the adhesive composition may be colored by means of suitable inorganic pigments.

The bonding composition may be applied with a brush, with a roller, with a gun, with a sizing machine or by any suitable conventional means. Setting occurs normally within 12–24 hours at room temperature and may be accelerated by heating.

Another highly important application of the composition of this invention is the production of flame-resistant and flame-proofing coatings on a variety of substrates such as wood, plywood, particle or fibre boards, expanded polystyrene, phenol foams, polyurethanes, cardboard-reinforced plaster, and the like.

For this latter application, the inorganic component comprises advantageously 20–50% of said silicate solution, 7–20% of said clay and 2–7% of said asbestos and the composition contains additionally 30–60wt%, by weight of the total composition, of an inorganic filler which may be, for example:

a. a powdered lava such as oriolite (perlite) having a particle size from about 1 micron to about 1 mm;

b. a powdered silica having a particle size from about 1 micron to about 1 mm;

c. unexpanded powdered mica having a particle size from about 1 mm to about 2 mm.

In said application also, the presence of a liquid silicone, in an amount of 1–3wt%, by weight of the total composition, is advantageous.

To ensure the swelling of the coating at elevated temperatures, a swelling agent, typically dinitrosopentamethylenetetramine (DNPT), or a phenol-formaldehyde, urea-formaldehyde, or melamine resin, etc.. should be added to the composition in an amount of about 1wt% to about 20wt%, by weight of the total composition.

Thus in the case of a high temperature increase (such as will occur during a fire, for example), the coating itself is found to swell (from 1 mm up to 2-4 mm) with resulting formation of closed cells and swelling of the coating with respect to the substrate, with 2-3 cm spacings therebetween, thereby forming insulating pockets. No cracking of the coating is found to occur and no toxic gases are evolved. The coating may withstand temperatures in excess of 1200° C.

The coating composition may also, if desired, contain setting accelerators and pigments, as previously mentioned.

The coating composition may be applied on the substrates by any suitable conventional means.

The process according to the invention for the preparation of the composition is carried out in the following manner.

The silicate solution is charged in a suitable container and is then rotated in a given direction by means of a suitable stirring device, at a speed preferably comprised between 500 rpm and 2000 rpm (advantageously at about 1000 rpm).

The aqueous organic component solution is prepared separately and is then intimately dispersed in the stirred silicate solution. To effect said dispersion, the organic solution is added portionwise, preferably near the bottom of the container, while rotating it in a direction opposite to that used to rotate the silicate solution; this may be achieved, for example, by means of a perforated dispensing head rotating at a speed of 250-1000 r.p.m. (preferably at a speed of about 500 r.p.m.).

On completion of the dispersion, the clay is added, with continued stirring, and the deflocculated asbestos fibres are then added and thoroughly dispersed in the liquid mixture.

When a mineral filler is to be added, this is added to the dispersion prior to addition of the clay; the liquid silicone, when used, is added after the asbestos and the optional swelling agents are added last.

All the process steps are conducted at ordinary temperature (preferably > 5° C).

The resulting composition may be stored in conventional pots, drums or closed containers without setting to a mass during a period of time of at least six months. Thus, it has a remarkably long shelf life for a composition of this type, which makes its use particularly advantageous and practical.

The following non limiting examples are given to illustrate the invention.

EXAMPLE I

The two following adhesive compositions are prepared according to the above-described method:

|  | Composition 1 (weight %) | Composition 2 (weight %) |
| --- | --- | --- |
| Sodium silicate (38/40° Be) | 85 | 76 |
| Kaolin | 7 | 16 |
| Deflocculated asbestos fibres | 4 | 4 |
| Solvitose CL* (50% aqueous solution) | 2 | 2 |
| Methyl siliconate (liquid silicone) | 2 | 2 |
|  | 100 | 100 |

*Starch ether sold by Doitteau, France.

Both compositions exhibit outstanding tack and, after setting, are classified "flame-resistant" and "fireproof" according to the usual standard specifications.

The tensile strength is found to be 11-15 kg/cm$^2$ at normal temperature when black sheet iron is bonded to concrete; after 7 days at 40° C and 95% relative humidity, the tensile strength is 11-18 kg/cm$^2$.

Agglomerated wood-fibre boards were bonded to concrete with the above compositions; the agglomerate breaks at 8-9 kg/cm$^2$ at normal temperature but the bonding plane remains intact.

Plywood was bonded with the composition: the plywood was found to break between 12 and 14 kg/cm$^2$, but the bonding plane remained intact.

Compositions exhibiting analogous properties were obtained by replacing the starch ester with carboxymethyl cellulose or dextrin.

EXAMPLE 2

Using the above-described process, the following coating composition was prepared:

|  | Weight % |
| --- | --- |
| Potassium silicate (42° Be) | 41 |
| Kaolin | 13 |
| Deflocculated asbestos fibres | 4 |
| Crude perlite | 40 |
| Solvitose CL (50% aqueous solution) | 1 |
| Methyl siliconate | 1 |
|  | 100 |

A flame-resistant and fireproofing coating is obtained after setting.

EXAMPLE 3

Using the previously described process, the following coating composition is prepared:

|  | Weight % |
| --- | --- |
| Sodium silicate (38/40° Be) | 41 |
| Kaolin | 8 |
| Deflocculated asbestos fibres | 4 |
| Crude perlite | 40 |
| Solvitose CL (50% aqueous solution) | 1 |
| Methyl siliconate | 1 |
| DNPT (swelling agent) | 5 |
|  | 100 |

This composition produced flame-resistant and fireproofing coatings which swell under the action of heat, as previously described.

For example, a sheet of Okoume-wood, 300 m × 400 mm × 5 mm, coated on both sides with 1 mm of the above coating, was classified "flame-resistant" according to the standard radiator test.

When the composition is to exhibit excellent resistance to humidity, and even to immersion, salts or oxides of metals such as Al, Mn, Cr, Pb, Ti, Ca, Fe, etc., may be added thereto, in an amount of about 0.5wt% to about 35wt%, by weight of the silicate.

An alkali metal (typically sodium) fluosilicate may also be incorporated at the time of use, in an amount of 5-10wt%, by weight of the total composition.

To dry the composition, silicides may be added in the case of air-drying, but the mixture may also be heated at a temperature of up to 200° C.

Having now described my invention what I claim as new and desire to secure by Letters Patent is:

1. Silicate-containing flame-resistant composition, comprising (1) an inorganic component comprising, with respect to the weight of the total composition, (a) 20wt% to 50wt% of a concentrated aqueous alkali metal silicate solution having a concentration of 38° to 42° Be, (b) 7wt% to 20wt% of kaolin and (c) 2wt% to 7wt% of deflocculated asbestos fibres; (2) an organic component, present as a 30–70% aqueous solution, selected from the group consisting of carboxymethylcellulose, starch ether, dextrin and a mixture thereof, said organic component, calculated as dry weight, being present in an amount of about 0.2wt% to about 2wt%, by weight of the total composition; and (3) 30wt% to 60wt%, by weight of the total composition, of crude perlite.

2. Composition as claimed in claim 1, further comprising methyl siliconate in an amount of about 1wt% to 3wt%, by weight of the total composition.

3. Composition as claimed in claim 1, further comprising a swelling agent which is dinitrosopentamethylene tetramine, in an amount of 1wt% to 20wt%, by weight of the total composition.

4. Composition as claimed in claim 1, further comprising an alkali metal fluosilicate in an amount of 0.5wt% to 10wt%, by weight of the total composition.

5. Composition as claimed in claim 1, wherein the concentrated silicate solution is 38°/40° Be sodium silicate.

6. Composition as claimed in claim 1, wherein the concentrated silicate solution is 42° Be potassium silicate.

7. Composition as claimed in claim 1, wherein the organic component is a starch ether.

* * * * *